(12) United States Patent
Hiratsuka

(10) Patent No.: US 8,424,108 B2
(45) Date of Patent: Apr. 16, 2013

(54) CONTENTS SUPPLYING SYSTEM

(75) Inventor: Satoshi Hiratsuka, Hamamatsu (JP)

(73) Assignee: Yamaha Corporation (JP)

( * ) Notice: Subject to any disclaimer, the term of this patent is extended or adjusted under 35 U.S.C. 154(b) by 1445 days.

(21) Appl. No.: 10/672,692

(22) Filed: Sep. 26, 2003

(65) Prior Publication Data

US 2004/0064380 A1 Apr. 1, 2004

(30) Foreign Application Priority Data

Sep. 26, 2002 (JP) ................................ 2002-280736

(51) Int. Cl.
*G06F 21/00* (2006.01)

(52) U.S. Cl.
USPC .............................................. 726/31; 726/26

(58) Field of Classification Search ........................ None
See application file for complete search history.

(56) References Cited

U.S. PATENT DOCUMENTS

| | | | |
|---|---|---|---|
| 5,530,520 A * | 6/1996 | Clearwater | 399/366 |
| 5,715,403 A * | 2/1998 | Stefik | 705/44 |
| 5,829,041 A * | 10/1998 | Okamoto et al. | 711/147 |
| 5,889,860 A * | 3/1999 | Eller et al. | 705/51 |
| 5,930,772 A | 7/1999 | Gomyo et al. | |
| 6,170,006 B1 * | 1/2001 | Namba | 709/217 |
| 6,260,040 B1 * | 7/2001 | Kauffman et al. | 707/10 |
| 6,772,340 B1 * | 8/2004 | Peinado et al. | 713/168 |
| 7,127,744 B2 * | 10/2006 | Levy | 726/26 |
| 7,278,165 B2 * | 10/2007 | Molaro | 726/27 |
| 7,278,169 B2 * | 10/2007 | Newman | 726/32 |
| 7,519,180 B2 * | 4/2009 | Wehrenberg | 380/203 |
| 2002/0002413 A1 | 1/2002 | Tokue | |
| 2002/0036800 A1 * | 3/2002 | Nozaki et al. | 358/1.15 |

(Continued)

FOREIGN PATENT DOCUMENTS

| | | |
|---|---|---|
| CN | 1332549 A | 1/2002 |
| EP | 1 229 425 A1 | 8/2002 |

(Continued)

OTHER PUBLICATIONS

Office Action, dated Jan. 6, 2006, issued in corresponding Chinese patent application No. 03159839.0.
Partial translation of Japanese Office Action dated Aug. 14, 2007 in corresponding JP 2002-280736.

*Primary Examiner* — Ali Abyaneh
*Assistant Examiner* — Jeffery Williams
(74) *Attorney, Agent, or Firm* — Rossi, Kimms & McDowell LLP

(57) ABSTRACT

Server SV of a contents supplying system according to this invention stores, together with numerous contents, contents purchase information including contents ID information and copy control data of already supplied contents as user information for each user US (a; b) of information processing terminal PC (a1, a2; b1) registered in advance. Upon request for supplying the contents from information processing terminal PC, server SV supplies the relevant contents and renews the contents purchase information of the relevant user by amendment. When information processing terminal PC sends to server SV a request for copying the downloaded contents, server SV sends the copy control data of the relevant contents as a reply. In accordance with the contents of the copy control data, information processing terminal PC determines whether or not to copy the relevant contents into external apparatus KD or recording medium RMb. Thus, the number of times for copying can be restricted, contents by contents, in accordance with a will of the contents supplier without imposing a burden on the user.

12 Claims, 6 Drawing Sheets

Overall view of the system

U.S. PATENT DOCUMENTS

| | | | | |
|---|---|---|---|---|
| 2002/0138441 A1* | 9/2002 | Lopatic | | 705/59 |
| 2002/0152381 A1* | 10/2002 | Kuriya et al. | | 713/170 |
| 2002/0186844 A1* | 12/2002 | Levy et al. | | 380/231 |
| 2002/0194355 A1* | 12/2002 | Morita et al. | | 709/231 |
| 2003/0061165 A1* | 3/2003 | Okamoto et al. | | 705/52 |
| 2003/0097338 A1* | 5/2003 | Mankovich et al. | | 705/64 |
| 2004/0172367 A1* | 9/2004 | Chavez | | 705/59 |

FOREIGN PATENT DOCUMENTS

| | | |
|---|---|---|
| JP | 09-265456 A | 10/1997 |
| JP | 11-224461 A | 8/1999 |
| JP | 2001-351322 A | 12/2001 |
| JP | 2002-41347 A | 2/2002 |
| JP | 2002-259416 A | 9/2002 |

* cited by examiner

Overall view of the system

Block diagram illustrating a hardware construction of each apparatus (in this case, a personal computer)

CONTENTS SUPPLYING SYSTEM

BACKGROUND OF THE INVENTION

1. Field of the Invention

The present invention relates to a contents supplying system that can restrict copying of downloaded contents.

2. Description of the Background Art

Hitherto, as proposed, for example, in Japanese Laid-open Patent Publication No. 2002-163560, a system is known in which a user purchases and downloads music data from a downloading site by using a personal computer connected to the internet and, in addition, sends the downloaded music data to an electronic musical instrument connected to the personal computer or supplies the downloaded music data to an electronic musical instrument via a recording medium.

In such a conventional method of purchasing contents, care of copyrights regarding the music data is considered to be under user's responsibility, with no physical restriction on copying the music data. Therefore, a user that does not have any knowledge on the copyrights and hence does not read cautions or a user with evil intentions can copy the music data without any restriction.

In view of the above-mentioned circumstances, an object of the present invention is to provide a contents supplying system in which the number of times for copying can be restricted, contents by contents, in accordance with a will of the contents supplier without imposing a burden on the user.

SUMMARY OF THE INVENTION

The object of the present invention is achieved by a construction as recited in the appended claims. To be brief, in a contents supplying system according to the present invention, using reference symbols or terms in the later-described embodiments, server apparatus (server) SV stores, together with numerous contents (music data) Dm, user ID information and contents (music data) purchase information Db including contents ID information (music reference numbers) and copy control data Dc of already supplied contents as user information Du for each user US (a; b) of the information processing terminal (personal computer) PC (a1, a2; b1) registered in advance. Upon request for supplying the contents from information processing terminal PC, server apparatus SV supplies the relevant contents and renews the contents purchase information Db of the relevant user US by amendment. When information processing terminal PC sends to server apparatus SV a request for copying the downloaded contents Dmd, server apparatus SV sends the copy control data Dc of the relevant contents as a reply. In accordance with the contents of the copy control data Dc, information processing terminal PC determines whether or not to copy the relevant contents into external apparatus (electronic musical instrument) KD or recording medium RM(b).

Therefore, according to the present invention, the number of times for copying can be restricted, contents Dm by contents Dm, in accordance with a will of contents supplier SV without imposing a burden on user US. Each time user US on the information processing terminal PC side wishes to copy the contents Dm, information processing terminal PC makes an inquiry to server apparatus SV on whether the copying is permitted or not, so that the copying can be restricted with certainty. In addition, once user US has purchased and downloaded contents Dmb, the user can redownload the contents Dmb into one or more information processing terminals PC that can be registered and controlled by server apparatus SV, in duplication without undergoing a fee-charging process.

Furthermore, information processing terminal PC restricts copying of contents Dmb into external apparatus KD or recording medium RM that is not registered in server apparatus SV and hence is out of control. Therefore, while protecting contents Dmb, the system gives user US a convenience of using the contents Dmb in a plurality of information processing apparatus PC, KD including information processing terminal PC.

DESCRIPTION OF THE PREFERRED EMBODIMENTS

Hereafter, preferred embodiments of the present invention will be described with reference to the attached drawings. Here, the following embodiments are to be considered only as simple examples, so that the present invention can be modified in various ways or can be implemented in various modes as long as such modifications or implementations do not depart from the spirit and scope of the present invention.

[Schematic Description of the System]

Figure 1A:
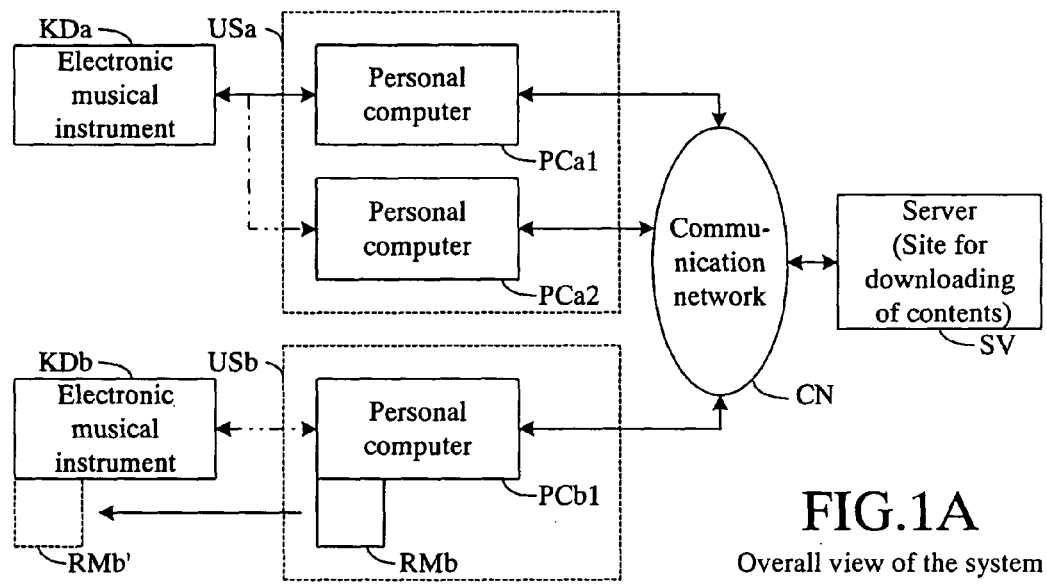
FIG. 1A is an overall construction view of a contents supplying system according to one embodiment of the present invention.
Figure 1B:
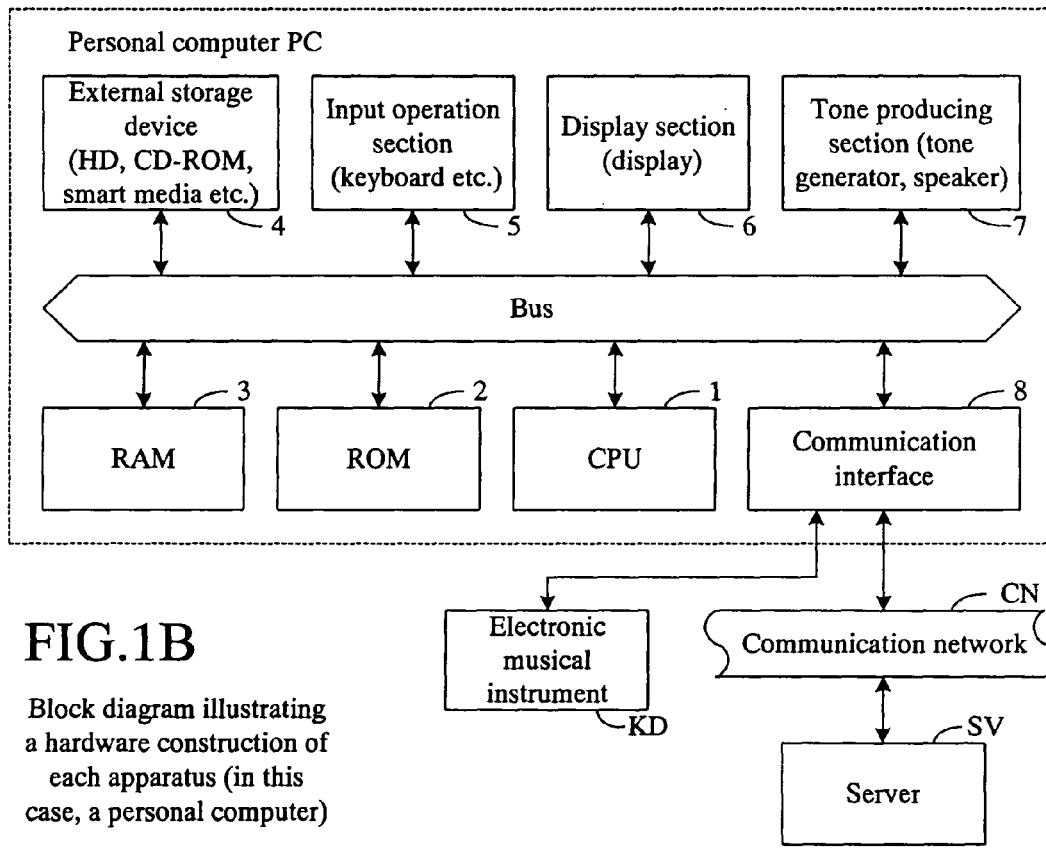
FIG. 1B is a hardware construction block diagram of each apparatus (example: PC) of the system.

FIGS. 1A and 1B are system construction views for describing the construction of a contents supplying system according to one embodiment of the present invention, where FIG. 1A is an overall view of the system, and FIG. 1B is a hardware construction block diagram illustrating a hardware construction of each apparatus constituting the system, using personal computer (PC) as an example.

Referring to FIG. 1A, this contents supplying system is made of a server (server computer such as a Web server) SV functioning as a site for downloading contents, a wide-area communication network CN such as the internet, a plurality of personal computers PCa1, PCa2; PCb1; . . . having a communication function, electronic musical instruments KDa; KDb; . . . that are dependent on the personal computers PCa1, PCa2; PCb1 . . . (i.e. that the relevant user uses as external apparatus belonging to the personal computers), and others. The personal computers PCa1, PCa2; PCb1; . . . are used by respective users USa; USb; . . . .

Each of the users USa; USb; . . . has a user ID and, when the user wishes to install a personal computer application program used exclusively for this contents supplying system (which program is referred to as "exclusive-use application") into respective personal computers PCa1, PCa2; PCb1; . . . , the user sends an apparatus number (PC number) of each computer, which number is represented, for example, by a MAC address (media access control address), to server SV through the communication network CN together with the user ID and others. Here, the MAC address is a physical address that is proper to a network card, and has a six byte length in the Ethernet (registered trademark), where the first three bytes are controlled/allotted by IEEE as a vendor code.

The remaining three bytes constitute a code that each vendor controls individually (so as to avoid occurrence of duplicated numbers). As a result, no two Ethernet cards have the same physical address in the world, so that all Ethernet cards have different addresses allotted thereto. In the Ethernet, frames are sent and received on the basis of these MAC addresses. Here, regarding the PC number, the server SV may impart a unique (single) number each time.

When the personal computer terminals PCa1, PCa2; PCb1; . . . are registered in the server SV in this manner, the personal computer terminals PCa1, PCa2; PCb1; . . . will be recognized by the server SV thereafter, whereby each of the users USa; USb; . . . can download contents from the server SV into the terminals and can supply the contents to each of the electronic musical instruments KDa; KDb; . . . .

For example, the user USa may have already registered two personal computers PCa1, PCa2 in the server SV, and may make an access to the server SV using any one of the plurality of personal computers PCa1, PCa2, or may purchase contents such as music data from the server SV using any one of the personal computers PCa1, PCa2, for storage into a storing device such as a hard disk (HD) so that the user USa can use the contents in accordance with the needs.

In this example, the user USa has connected an electronic musical instrument KDa to the personal computer A1 by using an interface such as MIDI (Musical Instrument Digital Interface), RS-232C, or USB, so that the music data stored in the storing device of the personal computer PCa1 can be sent to the electronic musical instrument KDa via this interface, and stored into a storing device such as a hard disk or flash memory of the electronic musical instrument KDa for use in the electronic musical instrument KDa.

On the other hand, the user USb in this example has registered only one personal computer PCb1 in the server SV and, since the aforementioned interface is absent, the music data are supplied from the personal computer PCb1 to the electronic musical instrument KDb via a portable recording medium RMb (→RMb') such as a smart media.

An overall hardware construction of each apparatus constituting this contents supplying system is illustrated by a block diagram exactly shown in FIG. 1B, using personal computers PC as an example. In FIG. 1A, each of the personal computers PC denoted by the symbols "PCa1", "PCa2"; "PCb1"; . . . in this example has a central processing unit (CPU) 1, a read-only memory (ROM) 2, a random access memory (RAM) 3, an external storing device 4, an input operation section 5, a display section 6, a tone producing section 7, a communication interface (communication I/F) 8, and others, and these devices 1 to 8 are connected with one another via a bus 9.

CPU 1 centrally performs various controls including the purchase and supply of contents and various processes accompanying the use of the contents by using a clock of timer 9 in accordance with a predetermined software program. For this purpose, ROM 2 stores various control programs such as the exclusive-use application and control parameters. RAM 3 is used as a work area for storing data and others needed in various processes.

External storing device 4 is a device that drives, besides the hard disk (HD), a portable-type recording medium RM such as a compact disk, a read-only memory (CD-ROM), a smart media magnetooptical (MO) disk, a flexible disk (FD), or a digital multi-purpose disk (DVD), and can store contents such as the MIDI data purchased from the server SV and other electronic music information into each recording medium (HD, RM).

Input operation section 5 is used for sensing the contents of operation carried out by an input operator such as a mouse or a keyboard, for introduction into the server SV to set the operation state of the server SV. Display section 6 is used for controlling a display in accordance with a command from CPU 1 for displaying the operation state or setting of the personal computer PC on the display or for aiding the display carried out by input operation section 5. Also, on the basis of image display information such as score display aiding data, lyric data, and image data contained in the contents delivered (supplied) from the server SV and image display information provided in the personal computer terminal PC itself, display section 6 can display the corresponding images on the display.

Tone producing section 7 is constructed with a MIDI tone generator, effect circuits including a DSP (digital signal processor) and the like, a D/A converter, a sound system including amplifiers and speakers, and others. On the basis of the music data contained in the contents delivered from the server SV and the music data provided in the terminal PC itself, tone producing section 7 can generate the corresponding musical tones.

A communication network CN such as the internet is connected to communication I/F 8 and, through this network CN, the personal computer PC can communicate with the server SV to send the server SV a request for delivery of contents for purchasing the relevant contents. Further, communication I/F 8 includes an interface such as MIDI, RS-232C, or USB and, through this interface, the electronic musical instrument KD (KDa) is connected to the personal computer PC, whereby the music data stored in storing device 4 can be sent to the relevant electronic musical instrument KD.

Here, although not illustrated in the drawings, the hardware construction of the server SV or the electronic musical instrument KD is generally the same as that in FIG. 1B, and the server SV does not have a tone producing section.

[Contents Stored in the Storing Device]

Figure 2:
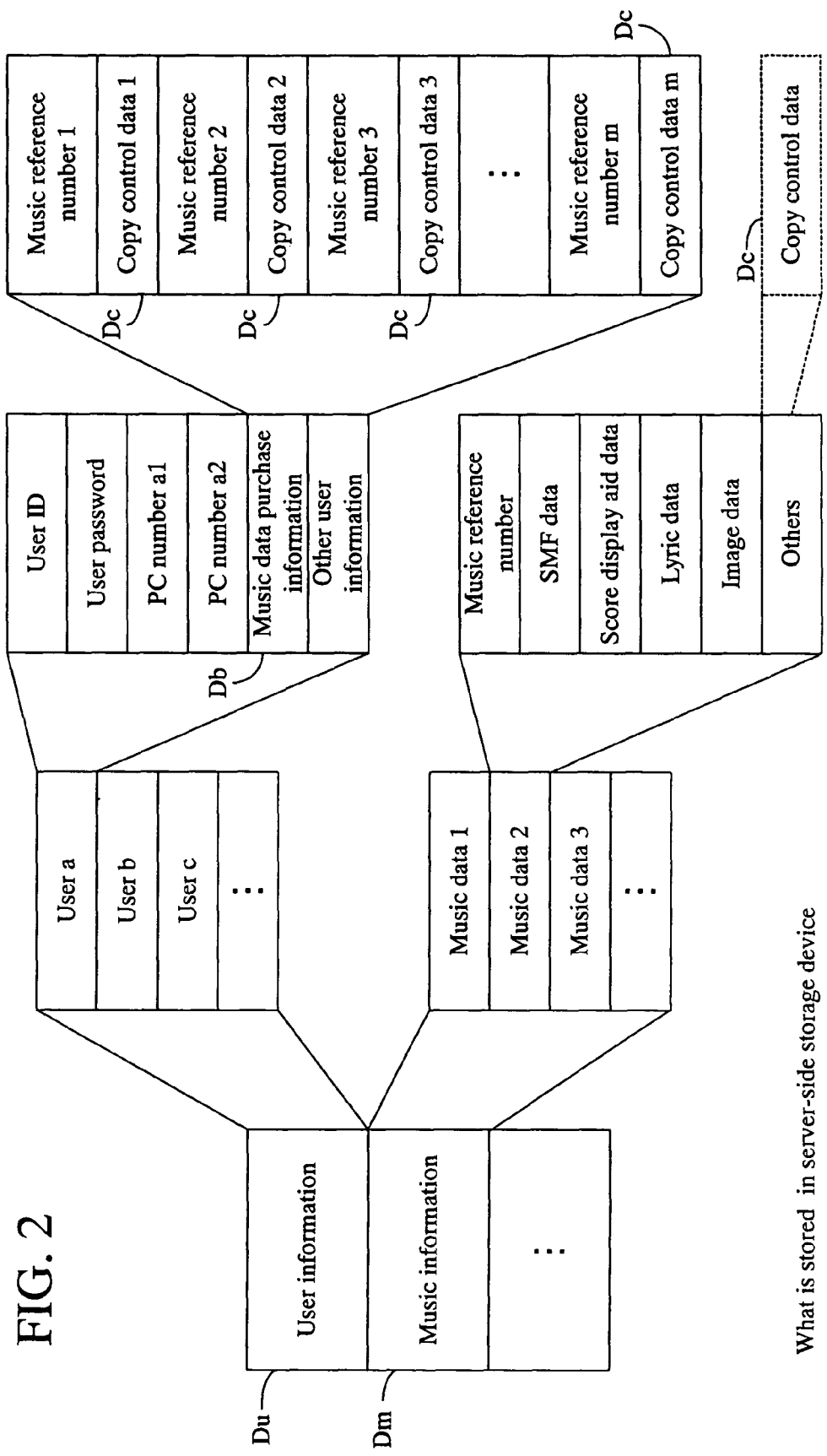
FIG. 2 is a view illustrating an example of what is stored in a SV (server)-side storage device according to one embodiment of the present invention.
Figure 3:
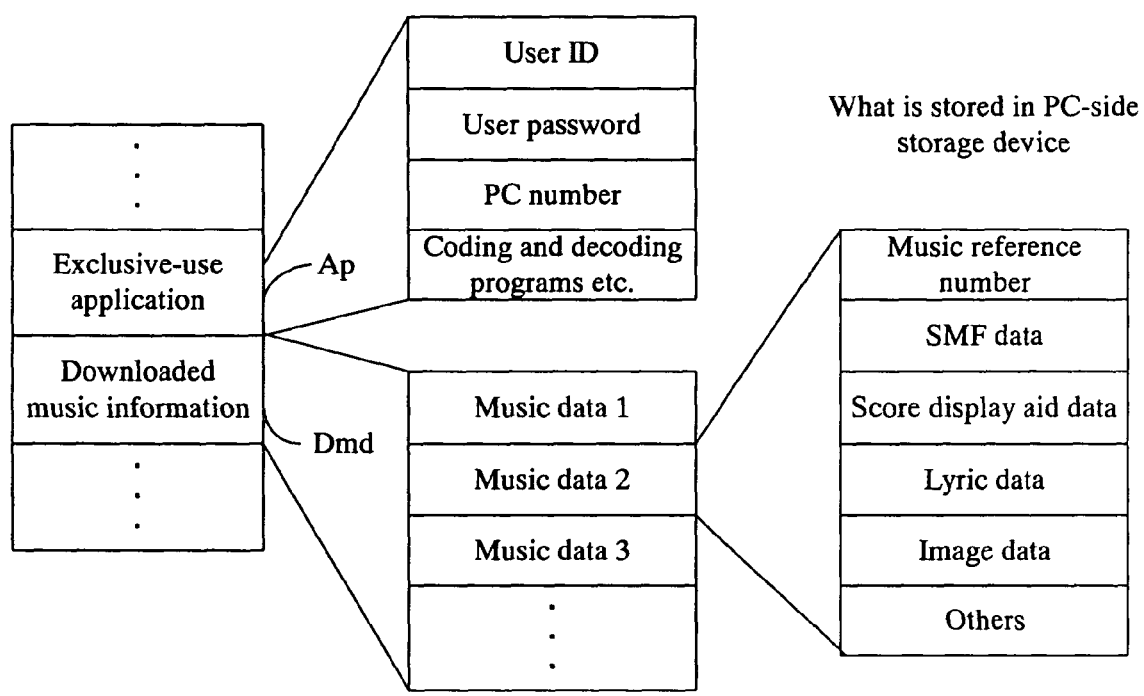
FIG. 3 is a view illustrating an example of what is stored in a PC (personal computer)-side storage device according to one embodiment of the present invention.

FIGS. 2 and 3 are views for describing the contents of information stored in the storing device of the server SV and the personal computer PC according to one embodiment of the present invention. The hard disk HD of the storing device 4 of the server SV stores personal information regarding each of the numerous users US (a, b, c, . . . ) registered in the server SV as user information Du, and stores numerous music data that can be delivered to each of the users US (a, b, c, . . . ) as music information Dm, as illustrated in the leftmost column of FIG. 2.

The user information Du is made of a user ID, a user password, apparatus numbers of the registered personal computers (PC numbers), music data purchase information Db on the already purchased music data, "other user information" related to individual users and needed for delivery of the contents, and the like, for each of the users US (a, b, c, . . . ), as illustrated in the two central columns of FIG. 2. Among these, the music data purchase information Db records music reference numbers (music ID numbers) for specifying the music data (1, 2, 3, . . . ) already purchased by the relevant user and copy control data Dc representing the number of times the relevant music data can be copied, in sets, as illustrated in the rightmost column of FIG. 2.

Here, a predetermined initial value (for example, "2") is set in the copy control data Dc at the downloading time, and this initial value restricts the number of times the music data downloaded by the relevant user can be copied. Further, each time the relevant music data are copied (sent, recorded) from the personal computer PC into the electronic musical instrument KD or recording medium RM, the contents of the copy control data Dc are decremented and indicate the current value of the number of times the relevant music data can be copied. Here, the initial value of the copy control data Dc (copy restriction times) may be set so as to be changed music by music by storing a different data value for each music.

Further, for each of the music data (1, 2, 3, . . . ), the music information Dm is made of a music reference number (music ID number) for specifying the relevant music data, an SMF (Standard MIDI File) representing the contents of the relevant music as well as lyric data, image data, and other data corresponding to the relevant music, as illustrated in the central two columns of FIG. 2. Here, the other data of each of the music data include the copy control data Dc representing the number of times the relevant music data can be copied, as shown by broken lines in the rightmost column. However, the copy control data Dc need not be stored for each of the music data if the same number (for example "2" (at the time of downloading)) is to be set, irrespective of the music, in the copy control data Dc.

On the other hand, the external storing device (for example, a HD) of each personal computer PC stores the exclusive-use application Ap and the music information Dmd downloaded from the server SV, as illustrated in the left column of FIG. 3. The exclusive-use application Ap includes a user ID and a user password of the user that uses this personal computer PC, an apparatus number (PC number) of the relevant computer, a coding program, a decoding program, and the like, as illustrated in the middle column of the upper part of FIG. 3. For each of the music data (1, 2, 3, . . . ) downloaded into the personal computer PC, the downloaded music information Dmd includes the music reference number of the relevant music data, as well as the SMF data, the score display aiding data, the lyric data, the image data, and other data related to the relevant music in the same manner as in the server SV, as illustrated in the middle and right columns of the lower part of FIG. 3.

[Schematic Description of Supplying the Contents]

Here, with reference to FIGS. 1A, 1B, 2, 3 a schematic description of the contents supplying operation of the contents supplying system according to one embodiment of the present invention will be given. When the user installs the exclusive-use application into the personal computer terminal PC, an apparatus number (PC number) proper to the terminal PC is set, and this number is sent to and registered in the server SV such as a contents vending site of the internet or the like, together with a new or already existing user ID and the like. With the use of the terminal PC, the user can download music contents Dm from the server SV for storage into storing device 4 (HD).

The server SV stores, for each user, the apparatus numbers of one or more personal computer terminals PC registered by the user, the reference numbers of the contents Dmb purchased and downloaded in the past by the user (music reference numbers (from zero to numerous)), the copy control data Dc representing the current number of times for permitting the copying in correspondence with the reference numbers, and others, together with the user ID and the user password. When the user wishes to perform a process of copying (storing) the downloaded contents Dmd from the terminal PC into the electronic musical instrument KD connected to this terminal or into the recording medium RM mounted on this terminal, the user makes access to the server SV to obtain from the server SV the copy control data Dc stored in correspondence with the contents Dmd supplied to the relevant terminal user, and the aforesaid copying process is validated or invalidated in accordance with the current contents of the copy control data Dc.

The exclusive-use application prepared in the personal computer terminal PC allows use of the contents (automatic playing, karaoke, and others) over the terminal PC, downloading of the contents from the server SV, copying of the contents into the electronic musical instrument KD or recording medium RM, and others. In this process, the contents on which the user has once performed a downloading and purchasing process can be downloaded individually into one or more terminals PC (a1, a2; b1) registered for the user; however, the number of times the contents can be copied into the electronic musical instrument KD or the like is restricted by the aforesaid copy control data Dc stored in the server SV.

In this system, even if one user USa makes access to the server SV by using a plurality of personal computer terminals PCa1, PCa2 to download the same contents respectively into the personal computer terminals PCa1, PCa2, this will be within the range of personal use, since the contents are in a secure state in which the contents can be used only by the exclusive-use application in the terminals PCa1, PCa2 registered in advance, as described above. Thus, the copyrights can be securely protected.

In addition, since the electronic musical instrument KD or usable recording medium RM connected to the personal computer terminal PC cannot be specified or controlled by the server SV side, the relevant terminal PC determines whether or not to execute the copying in accordance with the contents of the copy control data Dc of the relevant music data Dmd obtained by making access to the server SV each time the user wishes to perform the operation of copying the already purchased music data Dmd (here, the value of the data Dc in the server SV is decremented by 1 immediately after reception by the terminal PC (the minimum value of Dc is "0")). This can restrict the number of times for copying to be within a range of numbers set in advance in the copy control data Dc under control of the server SV, thereby achieving protection of the copyrights.

(Operation Flow of Supplying the Contents)

Figure 4A:
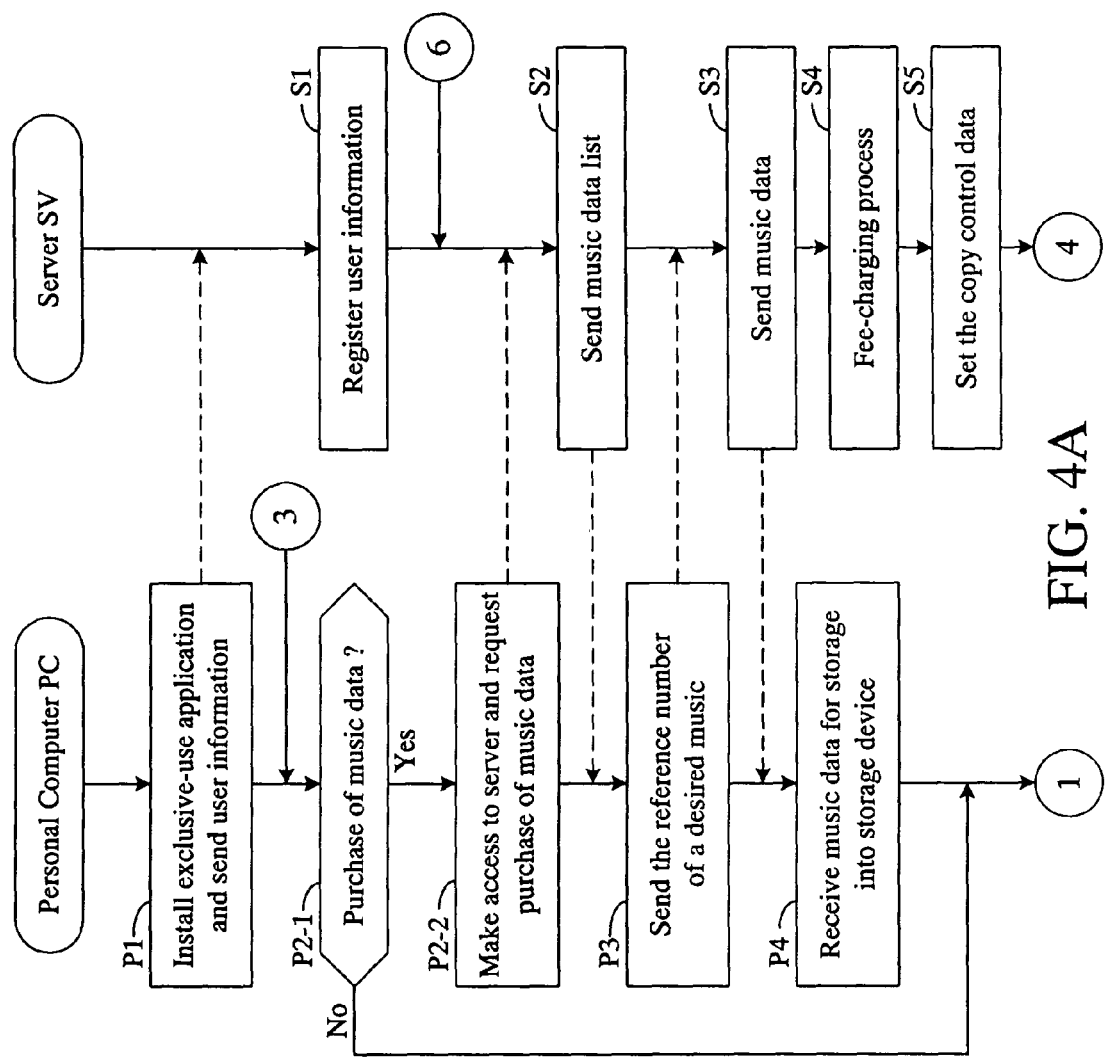
FIGS. 4A to 4C are flowcharts representing an operation example of the contents supplying system according to one embodiment of the present invention.
Figure 4B:
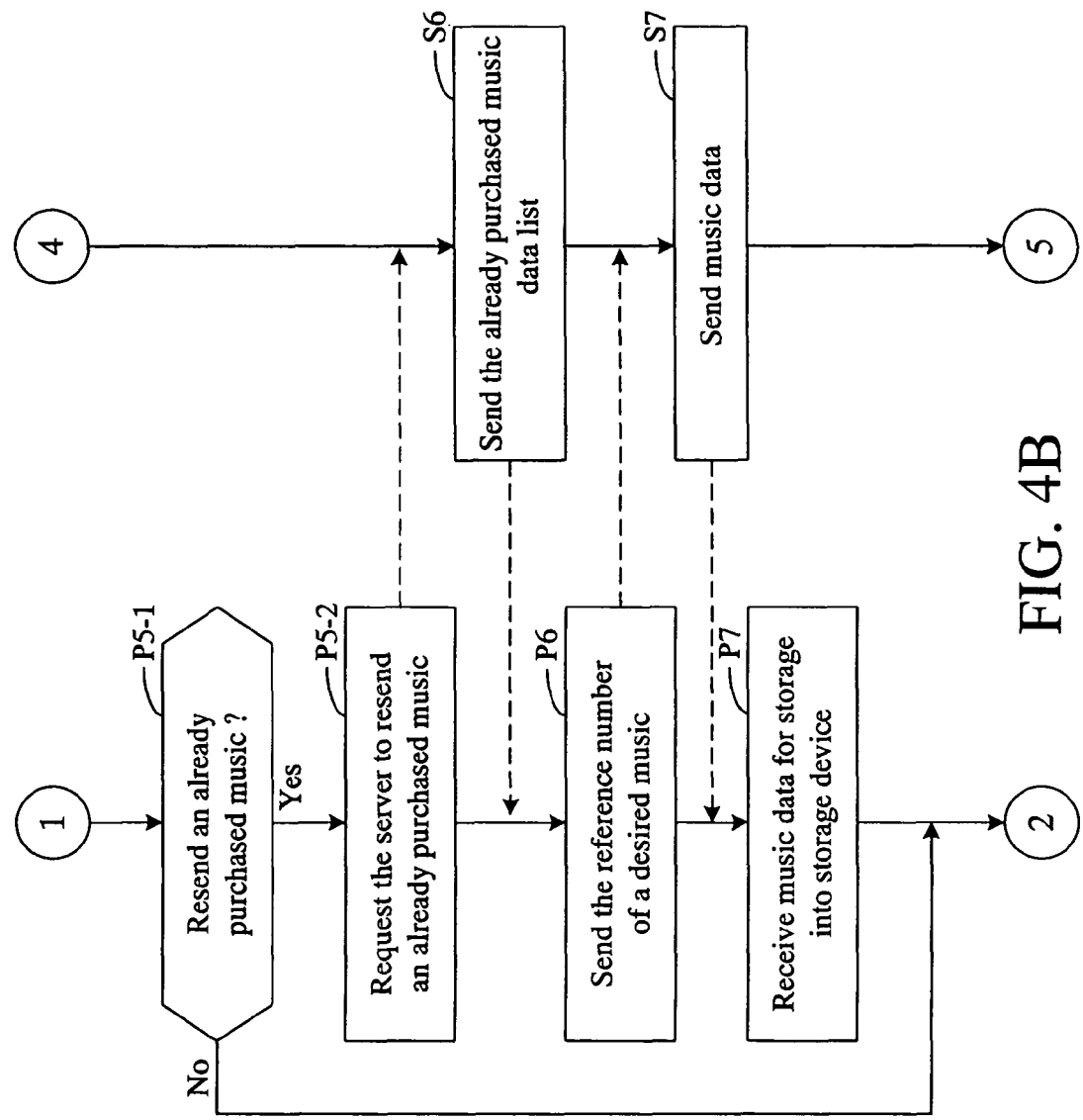
Figure 4C:
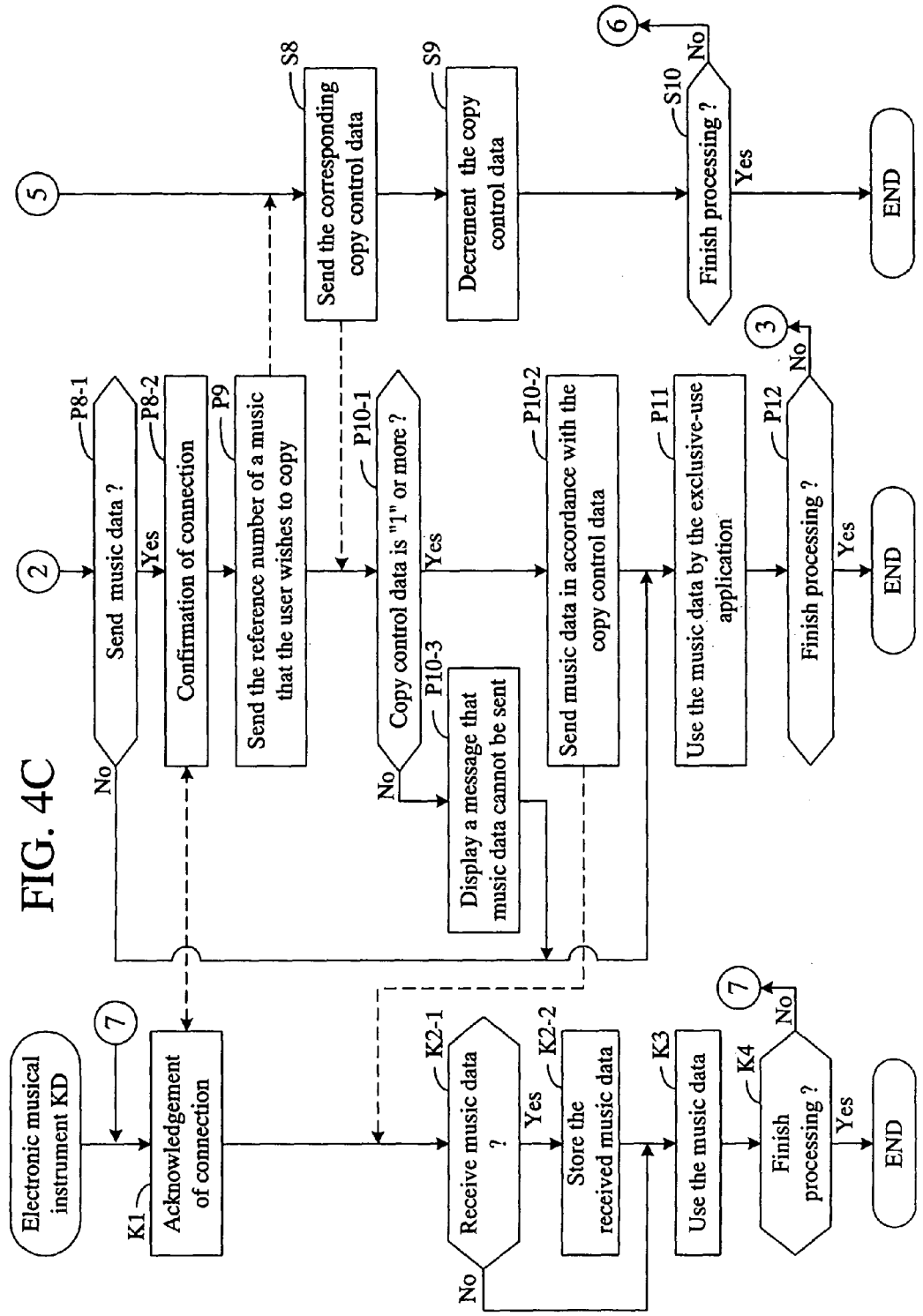

FIGS. 4A to 4C are flowcharts showing an operation example of the contents supplying system according to one embodiment of the present invention. Hereafter, with reference to this operation flow, an operation example of the system, from [1] registration of user information to [5] use of the music data, will be described.

[1] User Information Registration (FIG. 4A: Steps P1, S1)

First, when the user installs an exclusive-use application in the personal computer terminal PC, the user information such as the user ID, the user password, and the PC number corresponding to the relevant terminal user is sent to the server SV together with the notification that the exclusive-use application has been installed into the relevant terminal PC (system participation information) (P1).

In response to this, the server SV registers the corresponding user information by making reference to the information sent from the terminal PC (S1). For example, the server SV confirms the system participation information and, when the server SV recognizes a new user from the user ID, the server SV adds an area of the relevant user to the user information area Du of the storing device (HD) of the server SV, and stores various information on the user sent from the terminal PC. Further, if the user is an already registered user, the server SV stores the PC number of the relevant user terminal PC into the user area Du corresponding to the user ID. Here, the processing of the steps P1, S1 are executed only when the user information is registered.

[2] Vending/Purchasing of the Music Data (FIG. 4A: Steps P2-1 to P4, S2 to S5)

Subsequently, when the user performs an operation of purchasing and downloading music data on the personal computer terminal PC side (P2-1 to P4), the server SV executes the corresponding process of vending the music data (S2 to S5). More specifically described, when the user wishes to purchase music data newly, the user makes access to the server SV from the personal computer terminal PC to request for purchase of the music data under the condition of "Yes" determination (P2-1 and P2-2). Then, the server SV sends a list of music data that can be purchased (S2). As a result, the list of music data is displayed on the display 6 of the terminal PC. When the user indicates a desired music by selection from this list of music data using an operator 5, the music reference number (music ID number) of the music data corresponding to the relevant music is sent to the server SV (P3).

In response to this, the server SV reads the music data corresponding to the received music reference number out from the music information area Dm of the storing device (HD), and sends the music data to the terminal PC (S3). In this case, the server SV performs a fee-charging process corresponding to the sent music data (S4), and adds the music reference number and the initial value (for example, "2") of the copy control data Dc to the music data purchase information area Db of the server SV, as illustrated in the rightmost column of FIG. 2 by amendment (S5). On the other hand, when the terminal PC receives the music data sent from the server SV, the terminal PC stores the received music data into storing device 4 (HD), and ends this operation/process of purchasing and downloading the music data (P4).

[3] Resupplying of Music Data [FIG. 4B: Steps P5-1 to P7, S6 and S7]

Also, in this system, when an operation of downloading the already purchased music data Dmd is performed on the personal computer terminal PC side (P6 and P7), the server SV executes a music data resupplying process (free) corresponding to this (S6 and S7). Namely, when the user wishes resupplying of music data because, for example, the already purchased music data Dmd have been erroneously deleted on the personal computer terminal PC side or the user USa wishes to download into the personal computer terminal PCa2 the contents already downloaded into the personal computer terminal PCa1, the user makes access from the terminal PCa2 to the server SV to request for resupplying of the music data under the condition of "Yes" determination (P5-1 and P5-2).

In response to this, the server SV sends, as a reply, a list of the music data already purchased by the relevant user to the personal computer terminal PC that has requested for the resupplying of the music data by making reference to the music data purchase information Db of the user information area Du of the relevant user in the storing device (HD) (S6). On the relevant terminal PC side, when the user indicates a desired music from the list of the already purchased music data, the music reference number (music ID number) of the relevant music data is sent to the server SV (P6). In response to this, the server SV reads the music data corresponding to the received music reference number out from the music information area Dm of the storing device (HD) and sends the music data to the relevant terminal PC (S7). Then, the relevant terminal PC receives the music data for storage into storing device 4 (HD) and ends the operation/process of resupplying the music data (P7).

[4] Copying Music Data (FIG. 4C: Steps P8-1 to P10-3, K1 to K2-2, S8 and S9)

Now, when the music data are downloaded into the personal computer terminal PC, the music data Dmd downloaded into the relevant terminal PC can be transferred to the storing device of the electronic musical instrument KD connected to the relevant terminal PC (P8-1 to P10-2, K1 to K2-2) or can be recorded into the recording medium RM for a predetermined number of times under control of the server SV (S8). In other words, in transferring the music data to the electronic musical instrument KD, the personal computer terminal PC first transmits a connection confirmation signal to the electronic musical instrument KD dependent on the relevant terminal PC to start a connection confirmation process under the condition of "Yes" determination (P8-1 and P8-2).

In response to this, a response of "connection OK" is sent to the terminal PC by a connection response signal from the electronic musical instrument KD as a reply (K1), whereby the connection between the two apparatus PC, KD is confirmed (P8). After this connection confirmation, when the user on the terminal PC side selectively indicates a desired music item that the user wishes to send to the relevant electronic musical instrument KD by a user operation 5 from the list of items (music titles, numbers, etc.) of the already purchased music data Dmd stored in storing device 4 (HD) and displayed on the display 6, the music reference number of the indicated item is sent to the server SV, thereby executing a request for copying of the corresponding music data (P9).

The server SV reads the copy control data corresponding to the sent music reference number out from the music data purchase information area Db of the relevant user information Du of the storing device (HD) and sends the copy control data to the relevant terminal PC as a reply (S8). Also, the server SV decrements the contents of the relevant copy control data stored in the information area Db by "1" (S9).

By making reference to the contents of the copy control data from the server SV, the terminal PC determines whether or not to permit sending of the relevant music data Dmd to the electronic musical instrument KD and, if the contents of the copy control data are "1" or more, the terminal PC determines as "Yes" (P10-1) and executes sending of the relevant music data Dmd (P10-2). Further, if the contents of the copy control data Dc are "0" (zero) (the decrement of the data Dc by "1" executed by the server SV each time the request for copying is sent is carried out until the data Dc become "0"), the terminal PC determines as "No" (P10-1) and lets the display 6 of the terminal PC display a message that "the music data cannot be sent because the music data are already copied" without sending the relevant music data to the electronic musical instrument KD (P10-3). Then, the electronic musical instrument KD that has received the music data stores the received music data into the storing device, keeping the music data still encoded under the condition of "Yes" determination (K2-1 and K2-2).

Here, if the user on the terminal PC side wishes to copy (record) the downloaded music data Dmd into the recording medium RM with the use of a driving device or reader/writer device of the recording medium of storing device 4, the terminal PC sends to the server SV the music reference number of the music data that the user wishes to copy in accompaniment to an operation of recording into the recording medium RM (P9), and determines whether or not to permit copying of the relevant music data Dmd by making reference to the contents of the copy control data Dc sent from the server SV in the same manner as in the aforementioned case of transferring the music data to the electronic musical instrument KD. If the contents of the copy control data Dc are "1" or more, the terminal PC executes copying of the music data into the recording medium RM under the condition of "Yes" determination (P10-1 and P10-2), whereas if the contents are "0", the terminal PC displays a message that "the music data cannot be copied into the medium RM because the music data are already copied" or the like message without executing the copying under the condition of "No" determination (P10-1 and P10-3).

[5] Use of the Music Data [FIG. 4C: Steps P11, K3]

The music data Dmd downloaded into the personal computer terminal PC can be used, for example, in the following manners (1) to (5) on the relevant terminal PC side in accordance with the exclusive-use application, independently from the server SV (steps P11 and K3).

(1) Display of score on display . . . image data of the score are created on the basis of the SMF data and the score display aiding data, and are displayed on the display 6 of the terminal PC.

(2) Automatic playing . . . the MIDI events in the SMF data are sent to the sound source which generates tone signals and the like to sound out through the speaker 7 of the terminal PC.

(3) Karaoke functions . . . automatic playing is carried out on the basis of the SMF data, and the lyrics and the background images are displayed on the display 6 on the basis of the lyric data and the image data.

(4) Decoding . . . the downloaded music data are coded by the server SV using the user ID as a key, and are stored into storing device 4 (HD) of the terminal PC in that state, so that, in performing automatic playing or karaoke, the music data are decoded and transferred to RAM 3 so that the music data can be used.

(5) Coding . . . in sending the music data to the electronic musical instrument or recording medium for copying, the music data are temporarily decoded and then coded again on the basis of the identification ID number of the electronic musical instrument KD or recording medium RM before sending the music data.

Further, in using the music data stored in the storing device such as a hard disk or flash memory on the electronic musical instrument KD side, the music data are decoded on the basis of the apparatus identification number of the electronic musical instrument KD and transferred to the RAM before using the music data. In this case, the music data can be used for score display, automatic playing, karaoke, and the like in the same manner as in the case of the exclusive-use application on the personal computer terminal PC side. Further, the apparatus type number of the electronic musical instrument KD is preferably a number proper to the electronic musical instrument, such as a production number.

In copying the music data into the recording medium RM for use as well, the apparatus type number is used. The electronic musical instrument KD having the recording medium RM mounted thereto stores the music data read out from the recording medium RM' (representing a state in which the recording medium RM is mounted onto the electronic musical instrument KD as in FIG. 1A) into a storing device such as a hard disk or flash memory, keeping the music data still coded. In using the music data, the music data are decoded on the basis of the apparatus type number of the recording medium. In this case, an apparatus type number set and stored in advance in the recording medium RM may be used.

Here, if the music data stored in a storing device such as a hard disk or flash memory in the electronic musical instrument KD are held in a secure state so as to prevent output of the music data to outside, the music data may be stored without being coded.

After processing of steps P12 and K3 for using the music data, the two apparatus PC, KD return to the step P2-1 and K1 respectively by determination processing of steps P12 and K4, if the user wishes to continue the executing the programs.

In this case, sever SV also returns to step S2 by determination processing of steps S10. The three apparatus PC, KD, SV finish the execution of the programs, if the user does not wishes to continue the executing the programs.

What is claimed is:

1. A contents supplying system comprising:
    a contents supplying server apparatus that supplies contents for downloading via a communication network; and
    a plurality of information processing terminals associated with a user, the contents from the contents supplying server apparatus being downloadable to each information processing terminal from the contents supplying server apparatus via a communication network,
    wherein the contents supplying server apparatus comprises:
        a server storing device storing, together with numerous contents, user information for the user, including user ID information representing a plurality of information processing terminals associated with the user and contents purchase information comprising contents ID information and copy control data, wherein the copy control data includes a total number of times the downloaded contents are allowed to be copied to an external apparatus or recording medium; and
        a server controller that, in response to a copy permission request from the user via one of the information processing terminals:
            supplies the copy control data of the user to the one information processing terminal, and
            decrements the total number of times the downloaded contents are allowed to be copied from any of the information processing terminals associated with the user, and
    wherein each of the information processing terminals comprises:
        a terminal storing device that stores the downloaded contents from the contents supplying server apparatus; and
        a terminal controller that sends, via a communication interface, to the contents supplying server apparatus a copy permission request for copying the downloaded contents to the external apparatus or recording medium each time before the downloaded contents are to be copied to the external apparatus or recording medium.

2. The contents supplying system according to claim 1, wherein said server storing device stores an initial value of the copy control data, contents by contents.

3. The contents supplying system according to claim 1, wherein said contents are music data.

4. The contents supplying system according to claim 1, wherein:
    each of the information processing terminals further receives, via the communication interface, the copy control data of the downloaded contents to be copied to the external apparatus or recording medium from the contents supplying server apparatus, and
    the terminal controller also determines whether or not to copy the downloaded contents into the external apparatus or recording medium based on the received copy control data.

5. The contents supplying system according to claim 4, wherein said contents are music data.

6. A non-transitory computer-readable medium storing a computer program for a contents supplying system comprising a contents supplying server apparatus that supplies contents for downloading, and a plurality of information processing terminals associated with a user, the contents from the contents supplying server apparatus being downloadable to each information processing terminal from the contents supplying server apparatus, the contents supplying server apparatus including a server storing device storing, together with numerous contents, user information for the user, including user ID information representing the information processing terminals associated with the user and contents purchase information comprising contents ID information and copy control data, wherein the copy control data includes a total number of times the downloaded contents are allowed to be copied to an external apparatus or recording medium, and the contents supplying server apparatus having a server controller, and the information processing terminals each having a terminal storing device and a terminal controller, the computer program including instructions for:

the server controller to, in response to a copy permission request from the user via one of the information processing terminals:

supply the copy control data of the user to the one information processing terminal; and decrement the total number of times the downloaded contents are allowed to be copied from any of the information processing terminals associated with the user;

storing the downloaded contents from the contents supplying server apparatus in the terminal storing devices of the information processing terminals; and the terminal controller of any of the information processing terminals to send, via a communication interface, to the contents supplying server apparatus, the copy permission request for copying the downloaded contents to the external apparatus or recording medium each time before the downloaded contents are to be copied to any external apparatus or recording medium.

7. The non-transitory computer-readable medium according to claim 6, wherein said contents are music data.

8. The contents supplying system according to claim 1, wherein the external apparatus is an electronic musical instrument.

9. The contents information processing terminal according to claim 4, wherein the external apparatus is an electronic musical instrument.

10. The non-transitory computer-readable medium according to claim 6, wherein the external apparatus is an electronic musical instrument.

11. The non-transitory computer-readable medium according to claim 6, wherein the computer program further includes instructions for each of the information processing terminals to:

receive the copy control data of the downloaded contents to be copied to the external apparatus or recording medium from the contents supplying server apparatus; and determine whether or not to copy the downloaded contents to the external apparatus or recording medium based on the received copy control data.

12. A method of supplying contents in a contents supplying system comprising a contents supplying server apparatus that supplies contents for downloading, and a plurality of information processing terminals associated with a user, the contents from the contents supplying server apparatus being downloadable to each information processing terminal from the contents supplying server apparatus, the contents supplying server apparatus including a server storing device storing, together with numerous contents, user information for the user, including user ID information representing the information processing terminals associated with the user and contents purchase information comprising contents ID information and copy control data, wherein the copy control data includes a total number of times the downloaded contents are allowed to be copied to an external apparatus or recording medium, and the contents supplying server apparatus having a server controller, and the information processing terminals each having a terminal storing device and a terminal controller, the method comprising the steps of:

having the server controller, in response to a copy permission request from the user via one of the information processing terminals:

supply the copy control data of the user to the one information processing terminal; and decrement the total number of times the downloaded contents are allowed to be copied from any of the information processing terminals associated with the user;

storing the downloaded contents from the contents supplying server apparatus in the terminal storing devices of the information processing terminals; and having the terminal controller of any of the information processing terminals send, via a communication interface, to the contents supplying server apparatus, the copy permission request for copying the downloaded contents to the external apparatus or recording medium each time before the downloaded contents are to be copied to any external apparatus or recording medium.

* * * * *